US012611799B2

(12) United States Patent
Leingartner et al.

(10) Patent No.: US 12,611,799 B2
(45) Date of Patent: Apr. 28, 2026

(54) METHOD AND DEVICE FOR PROCESSING POLYCONDENSATES

(71) Applicant: SML MASCHINENGESELLSCHAFT M.B.H., Redlham (AT)

(72) Inventors: Julian Leingartner, Puchkirchen (AT); Hans-Jürgen Luger, Linz (AT); Max Philip Lutz, Altmuenster (AT)

(73) Assignee: SML MASCHINENGESELLSCHAFT M.B.H., Redlham (AT)

( * ) Notice: Subject to any disclaimer, the term of this patent is extended or adjusted under 35 U.S.C. 154(b) by 497 days.

(21) Appl. No.: 18/035,340

(22) PCT Filed: Sep. 6, 2021

(86) PCT No.: PCT/EP2021/074506
§ 371 (c)(1),
(2) Date: May 4, 2023

(87) PCT Pub. No.: WO2022/096179
PCT Pub. Date: May 12, 2022

(65) Prior Publication Data
US 2024/0009890 A1     Jan. 11, 2024

(30) Foreign Application Priority Data
Nov. 4, 2020     (EP) ..................................... 20205695

(51) Int. Cl.
*B29B 7/42*          (2006.01)
*B29B 7/48*          (2006.01)
(Continued)

(52) U.S. Cl.
CPC ................ *B29B 7/426* (2013.01); *B29B 7/48* (2013.01); *B29B 7/603* (2013.01); *B29B 7/748* (2013.01);
(Continued)

(58) Field of Classification Search
None
See application file for complete search history.

(56) References Cited

U.S. PATENT DOCUMENTS 4,902,455 A     2/1990   Wobbe
5,102,594 A     4/1992   Burlet
(Continued)

FOREIGN PATENT DOCUMENTS

AT          521534 A2 *   2/2020
CN       101671412 A      3/2010
(Continued)

OTHER PUBLICATIONS

International Search Report of PCT/EP2021/074506 Dated Dec. 20, 2021, 3 Pages.
(Continued)

*Primary Examiner* — Tae H Yoon
(74) *Attorney, Agent, or Firm* — LUCAS & MERCANTI, LLP; Klaus P. Stoffel

(57) ABSTRACT

A method for processing polycondensates, wherein the material in the form of granules or recyclate is processed to form a melt, the method including the following steps: a) feeding the material into a vacuum lock where the material is held below atmospheric pressure; b) conveying the material from the vacuum lock into a first extruder having a filling region and a feed zone that are held below atmospheric pressure, wherein the material is at least partially melted in the first extruder; c) conveying the melted material from the first extruder into a second, twin-screw extruder
(Continued)

with two screws that turn in the opposite direction. The second extruder has at least one degassing zone and a metering zone that follows in the conveying direction. The melted material is degassed in the degassing zone and the melted material is pressurized in the metering zone and is output out of the second extruder.

24 Claims, 1 Drawing Sheet

(51) Int. Cl.

| | | |
|---|---|---|
| *B29B 7/60* | (2006.01) | |
| *B29B 7/74* | (2006.01) | |
| *B29B 7/84* | (2006.01) | |
| *B29B 7/86* | (2006.01) | |
| *C08J 3/12* | (2006.01) | |
| B29K 67/00 | (2006.01) | |
| B29K 105/26 | (2006.01) | |

(52) U.S. Cl.
CPC ............... *B29B 7/845* (2013.01); *B29B 7/86* (2013.01); *C08J 3/12* (2013.01); *B29K 2067/003* (2013.01); *B29K 2105/26* (2013.01); *C08J 2367/03* (2013.01)

(56) References Cited

U.S. PATENT DOCUMENTS

| | | | | |
|---|---|---|---|---|
| 5,626,420 A | * | 5/1997 | Deal ..................... | B29C 48/535 |
| | | | | 366/75 |
| 10,040,049 B2 | | 8/2018 | Gneuss | |

| | | | |
|---|---|---|---|
| 10,710,036 B2 | | 7/2020 | Behoun |
| 11,472,064 B2 | | 10/2022 | Pichler |
| 2004/0164437 A1 | | 8/2004 | Morton-Finger |

FOREIGN PATENT DOCUMENTS

| | | | | |
|---|---|---|---|---|
| DE | 3744193 | C1 | | 1/1989 |
| DE | 280500 | A5 | | 7/1990 |
| DE | 4232616 | A1 | | 4/1993 |
| DE | 102012206100 | A1 | * | 10/2013 |
| DE | 102013019611 | A1 | | 5/2015 |
| DE | 102018128884 | A1 | | 5/2020 |
| EP | 1226922 | A1 | | 7/2002 |
| EP | 1440783 | A1 | * | 7/2004 |
| EP | 3274148 | B1 | | 1/2019 |
| JP | 2004535319 | A | * | 11/2004 |
| WO | 2012051639 | A1 | | 4/2012 |
| WO | 2020006591 | A1 | | 1/2020 |

OTHER PUBLICATIONS

Hensen F [DE] et al. "Kaskaden-Extrusionssysteme Verbessern Den Extrusionprozess" Kunststoffe, Carl Hanser Verlag, Munchen, DE, vol. 80, No. 6, Jun. 1, 1990 (Jun. 1, 1990), pp. 673-678 ISSN: 0023-5563, XP000159858.

* cited by examiner

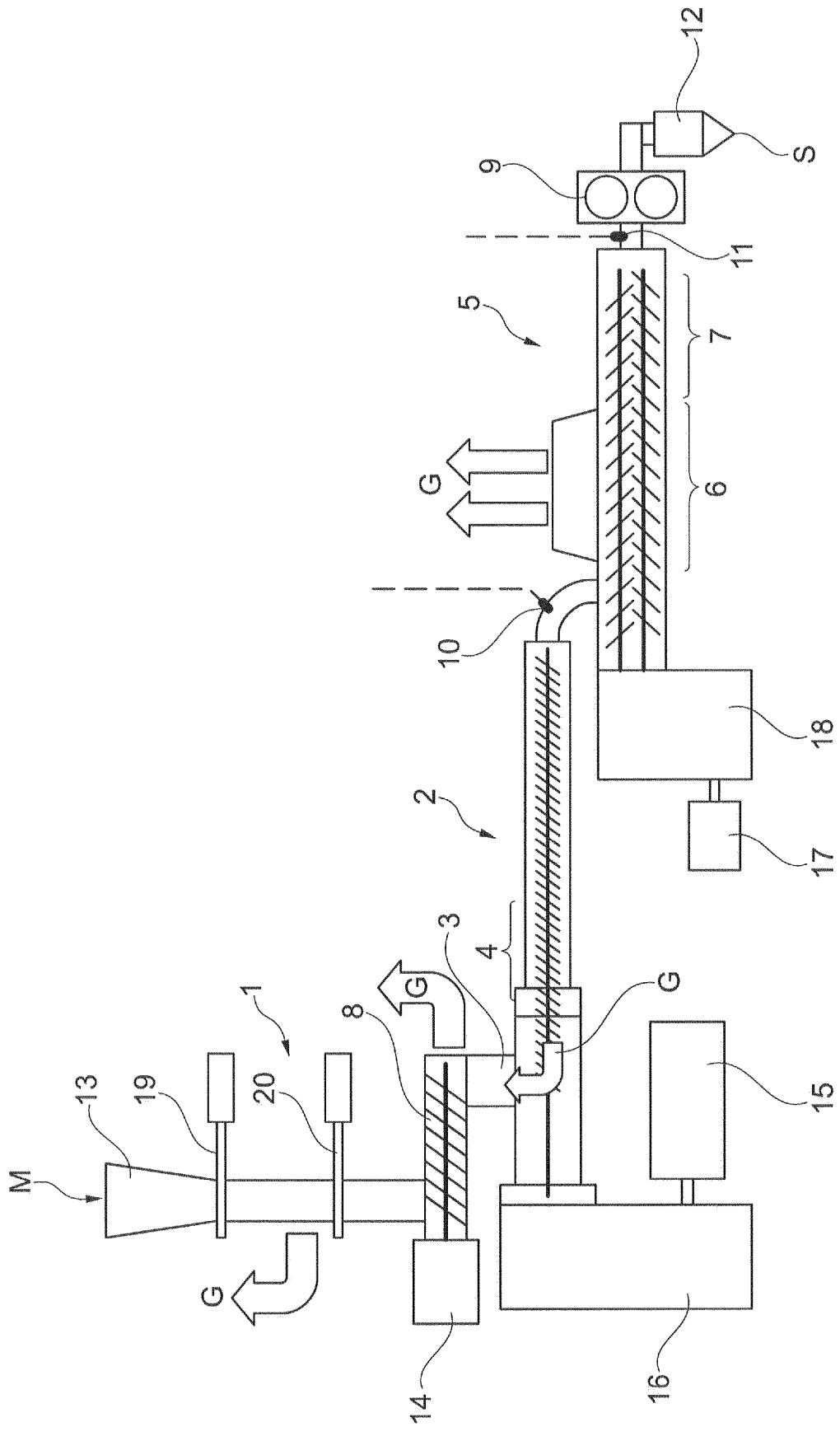

METHOD AND DEVICE FOR PROCESSING POLYCONDENSATES

CROSS-REFERENCE TO RELATED APPLICATIONS

The present application is a 371 of International application PCT/EP2021/074506, filed Sep. 6, 2021, which claims priority of EP 20205695.8 filed Nov. 4, 2020 the priority of these applications is hereby claimed and the applications are incorporated herein by reference.

BACKGROUND OF THE INVENTION

The invention relates to a method for processing polycondensates, especially polyethylene terephthalate, wherein the material in the form of granules or in the form of recyclate is processed to form a melt. Furthermore, the invention relates to a device for processing polycondensates.

A generic method and a corresponding device are known from DE 42 32 616 A1.

Polymers produced by polycondensation, such as polyethylene terephthalate (PET), are hygroscopic and therefore tend to absorb water. Water contained in the material, low-molecular components and resulting cleavage products lead to a shortening of the molecular chains during processing and thus to a reduction in viscosity. A sufficiently high viscosity, measurable for example by means of the so-called IV-value, is necessary for further processing. In addition, the mechanical and physical properties of the end product are also determined by the material degradation that occurs during processing. In terms of process technology, the gentlest possible material processing and the prevention of hydrolytic material degradation are therefore essential. The quality-determining factor is the removal of water and other volatile components before and during processing.

Processes in which materials with low initial viscosity are processed are particularly critical with regard to material degradation. This applies above all to the processing of recyclate that has already been damaged by one or more previous processing steps. Especially for the material PET, there is great industrial relevance here, as large quantities of bottle and film regrind are processed nowadays.

The processing of recyclates poses the challenge that they are subject to considerable material fluctuations, especially with regard to the raw material. For a stable processing procedure, such a system must be able to take into account low bulk densities on the one hand and bulk density fluctuations on the other.

It is known in this context that drying systems with a throughput time of at least 4 to 6 hours as well as process temperatures of approx. 160° C. are used in the processing of polycondensates, in particular PET, prior the extrusion. However, these are expensive to purchase and operate (especially from the point of view of energy consumption). In the case of recyclate in the form of film or bottle regrind, the drying process and material handling also become very complex. In the case of direct feeding of extruders, bulk density fluctuations lead to considerable process fluctuations.

Furthermore, various solutions have become known to solve the problems that arise here and namely to avoid a drying process.

DD 280 500 A5 describes a process for dosing under vacuum by means of an extruder, preferably a twin screw extruder. It is provided that the material is kneaded, heated and degassed by the screw conveyor below melting temperature. The disadvantage here is that the degassing capacity is limited below the melting temperature.

According to WO 2012/051639 A1, the degassing performance is increased by preheating the material by means of a heated storage container, which is connected upstream of the metering device or the metering screw. In both cases, further processing is carried out by means of single or twin screw extruders, which are equipped with one or more degassing zones.

It is also known that the pressure build-up is taken over by a melt pump in order to reduce the shear input and thus the material degradation in the material discharge zone of the extruder. In contrast to the forced conveying of a melt pump, the pumping efficiency of an extruder, especially in the case of a co-rotating twin screw extruder, is lower due to the conveying mechanism based on drag and pressure flow. In combination with introduced moisture in the material, shear, long residence time and high melt temperatures lead to rapid material degradation. Disadvantages of a melt pump, however, are the poor self-cleaning of the gears as well as the stagnation of the material in the sliding bearings. This also leads to material degradation, which results in a yellow colour or an increase in fission products such as acetaldehyde (AA).

To increase the degassing performance, a co-rotating twin screw extruder with several degassing zones (atmospheric and under vacuum) is proposed in EP 1 226 922 B1, whereby the pre-drying of the material is dispensed with. In EP 1 440 783 A1, a co-rotating twin-screw extruder with degassing for the production of PET packaging straps is proposed in a similar design. Modified single-screw extruders with increased degassing capacity are also known.

For example, DE 10 2013 019 611 A1 and DE 10 2018 128 884 A1 use a so-called rotor or satellite element in which several mixing worms are inserted. The disadvantage of this system is again the risk of material deposits in dead spots as well as a wide residence time spectrum.

In addition, it is known from the article by F. Hensen and W. Imping "Kaskaden-Extrusionssysteme verbessern den Extrusionsprozess" (Kunststoffe 80.6 (1990), pages 673 to 678) that the various process steps for melt preparation in the extrusion process can be divided between two or more extruders connected in series. The advantage of such an extruder cascade is that each extruder can be adapted to the respective process step in terms of machine construction and process technology. For this purpose, a three-stage extruder cascade is proposed in the aforementioned DE 42 32 616 A1, in which a co-rotating twin-screw extruder is used for degassing the melted plastic. A single-screw extruder is proposed for melting and a single-screw extruder or a melt pump for material discharge.

In general, however, the main disadvantage of extrusion systems that do not use pre-drying or that only carry out degassing in the molten state is that the moisture present leads to considerable material damage in the melting process. Experience shows that this quickly exceeds the acceptable level for the final product quality. To counteract this, methods are also known which enable a viscosity build-up, i.e. the reversal of the degradation reaction. A distinction is made between polycondensation reactions in the solid state ("Solid State Polycondensation"—SSP) and liquid state ("Liquid State Polycondensation"—LSP). EP 3 274 148 B1 describes a system for carrying out LSP (this document is expressly referred to in the light of the following explanations). The disadvantage of this system is that it results in very long dwell times and material change times, which limits production flexibility. In the case of PET, for example, the long dwell time leads to the formation of conjugated double bonds in the molecular chains due to parallel continuous reactions and thus to the yellowing of the melt. A previous melting of undried, moist material leads to a further increase in the residence time, as the loss of viscosity must again be compensated for by an extended reaction time.

Plants and processes using SSP are also known. These can be connected upstream or downstream of the extrusion process. In the case of upstream and regrind processing, a major disadvantage of the process is that the achievable viscosity increase is significantly related to the size and shape of the material. Thus, the SSP process allows only small variations in bulk density in order to maintain a constant material quality. Likewise, in the case of PET-G, there is a risk that the ground material will stick above the glass transition temperature. Therefore, agitators are used, such as described for example in AT 411 235 B and in AT 413 965 B. Although the proposed processes allow an increase in viscosity, the disadvantages already mentioned are present in the existing extrusion unit with single or twin screw extruder and melt pump. In addition, the process control is very complex, material change times are just as high and in total the viscosity increase in the SSP reactor is usually cancelled out by material damage in the extrusion.

SUMMARY OF THE INVENTION

The invention is therefore based on the object of providing a method and a device of the type mentioned above, with which it is possible to keep the loss of viscosity due to hydrolytic degradation as low as possible and to allow production with sufficient material quality.

Furthermore, the aim is to achieve a short residence time, a narrow residence time spectrum, efficient degassing, gentle melting and efficient pressure build-up.

In contrast to large-volume drying plants and reactors (SSP, LSP), short material and recipe changes should be realisable. In addition, the greatest possible flexibility should be achieved for the combined processing of virgin material (granulate) and recycled material (regrind) (reactors for the LSP and the SSP only allow an increase in viscosity, the extent of which depends on the process control). Due to the long residence time in the melt phase, the LSP process has the disadvantage of a high yellow colouration. In both SSP and LSP processes, a melt pump is usually used for material discharge, which has dead zones with stagnating melt. This in turn causes material degradation, yellowing and the formation of undesirable decomposition products (e.g. acetaldehyde). It is therefore a further object of the invention to make it possible to dispense with a melt pump.

The solution of this object by the invention is characterised in that the method comprises the sequence of the following steps:

a) feeding the material into a vacuum lock in which the material is held at a pressure lower than the atmospheric pressure;

b) conveying the material from the vacuum lock into a first extruder that has a filling region and a feed zone, wherein the filling region and the feed zone are held at a pressure lower than the atmospheric pressure and wherein the material is at least partially, preferably completely, melted in the first extruder;

c) conveying the at least partially melted material from the first extruder into a second extruder, wherein the second extruder is designed as a twin-screw extruder and the two screws thereof are turned in the opposite direction, wherein the second extruder comprises at least one degassing zone and a metering zone that follows in the conveying direction, wherein the melted material is degassed in the degassing zone and the melted material is pressurised in the metering zone and is output out of the second extruder.

Preferably, a metering element is arranged between the vacuum lock and the first extruder, wherein the material being conveyed by means of the metering element from the vacuum lock into the first extruder at a predetermined mass or volume flow (mass or volume of material per time). Thereby, the material is especially preferred conveyed from the metering element into the first extruder with such a mass or volume flow that the feed zone of the first extruder is not completely filled with material; preferably, a maximum filling quantity of 95% (or even only 90%) is provided here, i.e. the volume of the screw channels that can take up material is filled with a maximum of 95% (or even only 90%) of material.

The pressure in the vacuum lock and/or in the filling region of the first extruder is preferably at most 100 mbar, whereby a range of pressure between 0.1 mbar and 10 mbar is particularly preferred. The pressure in the degassing zone of the second extruder is preferably at most 100 mbar, especially preferably at most 30 mbar.

A single-screw extruder is preferably used as the first extruder, although a multi-screw extruder is also possible.

The material is preferably filtered between the first extruder and the second extruder. Furthermore, it can be provided that the material is filtered after the second extruder.

A preferred further embodiment of the proposed method is that the viscosity of the material between the first extruder and the second extruder is measured by means of a rheometer. Similarly, the viscosity of the material downstream of the second extruder can be measured additively or alternatively by means of a rheometer. In this case, it can then be provided that, depending on the measured viscosity of the material downstream of the first extruder and/or downstream of the second extruder, at least one process parameter is changed, preferably in a closed control loop. In this case, the process parameter is in particular the negative pressure in the filling region and/or in the feed zone of the first extruder. Furthermore, the process parameter can be the negative pressure in the degassing zone of the second extruder. This makes it possible to constantly monitor the quality of the melt to be produced and to (automatically) keep its properties within a predefined range.

Means for increasing the pressure, in particular a melt pump, can be arranged behind the second extruder and the pressure in the material can be increased with this means.

The material can be dried before it is fed into the vacuum lock, in particular by means of a vacuum dryer or an infrared dryer.

As a further advantageous measure, it can be provided that after the material has been fed into the vacuum lock, an increase in the viscosity of the material is carried out by solid state polycondensation (SSP). In an analogous way, it is also possible that after melting the material in the first extruder and/or in the second extruder, an increase in the viscosity of the material is carried out by liquid state polycondensation (LSP).

The device for processing polycondensates, in particular polyethylene terephthalate, with which the material can be processed into a melt in the form of granules or in the form of recyclate, comprises a first extruder, which has a filling region and a feed zone, and a second extruder downstream of the first extruder, the second extruder being designed as a twin-screw extruder and the second extruder having at least one degassing zone, the device being characterised in accordance with the invention by a vacuum lock in which the material can be kept under a pressure which is reduced in comparison with the ambient (atmospheric) pressure, wherein the first extruder being arranged downstream of the vacuum lock, wherein the two screws in the second extruder being designed to rotate in opposite directions and wherein the second extruder having a metering zone which follows the degassing zone in the conveying direction.

A metering element can be arranged between the vacuum lock and the first extruder for conveying the material with a predetermined mass or volume flow.

The first extruder is preferably a single-screw extruder.

A filter can be arranged between the first extruder and the second extruder. Furthermore, a filter can be arranged downstream of the second extruder.

A rheometer for measuring the viscosity of the material can be arranged between the first extruder and the second extruder. Furthermore, a rheometer for measuring the viscosity of the material can be arranged behind the second extruder.

Means for increasing the pressure, in particular a melt pump, can also be arranged downstream of the second extruder. Preferably, however, such means are not used.

The present idea thus relates to a method and a device for processing polycondensates, in particular PET, in the form of granulate or recyclate (e.g. ground bottle or film material). In this process, the starting material, which may be present in an undried state, is fed via the vacuum lock to a dosing device, e.g. screw conveyor, which is under vacuum. The dosing device is used to feed the first extruder, preferably a single-screw extruder, in which the material is degassed, compressed and melted. The upstream metering makes it possible to operate the first extruder in underfed mode, i.e. with only partially filled screw channels, in particular over a considerable section of the longitudinal extension of the extruder. Especially with simultaneous preheating, it is thus possible to continue degassing the material efficiently under vacuum, whereby this degassing takes place "backwards", i.e. against the conveying direction. The material is then fed in a molten state to a counter-rotating twin-screw extruder, i.e. the second extruder. In the twin-screw extruder, the melt is additionally degassed by utilising coalescence, large surface area and long residence time; in the metering zone of the second extruder, the necessary extrusion pressure is built up by the given forced conveying.

Previously known solutions rely on high degassing performance in the melt phase, for example by using co-rotating twin-screw extruders or special mixing elements with several screws. The advantage of the present invention, in contrast to this, is that a significant proportion of the moisture and volatile components contained in the material are removed before the melting process, thus preventing hydrolytic degradation. With the proposed solution, degassing in the melt phase takes place at significantly lower screw speeds than with previously known solutions. This allows longer residence times in the degassing zone compared to known solutions and thus an increased degassing performance. In addition to the increase in diffusion, the macroscopic mass transport in the form of gas bubbles is also increased, as there is no dispersion of gas bubbles compared to high-speed extruders. Likewise, an efficient pressure build-up is made possible in the same extruder by forced conveying. Compared to a melt pump, there is much better self-cleaning in the extruder according to the present invention. This in turn prevents material degradation with the associated effects on material quality.

With large dimensioning of the degassing zone, a viscosity build-up is possible through an LSP reaction. The design of the screw geometry enables a narrow residence time spectrum and good self-cleaning.

Likewise, it is possible to implement a separate device to realise the viscosity build-up by LSP between the first and second extruder of the cascade. In this case, the degassing zone of the twin-screw extruder can be omitted and it can only be used for gentle melt discharge and pressure build-up.

If the volume after the vacuum lock at the beginning of the plant is designed accordingly, an increase in viscosity can be realised by an SSP reaction before melting.

Thus, the proposed concept comprises in particular a vacuum lock, an evacuated metering unit, as well as two extruders connected in series (in cascade). Degassing prior to melting of the material takes place in the vacuum dosing unit and in the feed zone of the first extruder (preferably designed as a single-screw extruder). The advantage of the metering unit is that it allows short material change times due to its compactness. In addition, it is possible to react very quickly to fluctuations in bulk density during the dosing process.

The use of the metering unit allows the first extruder to be shortened operated, which means that the filling region is also under vacuum. A relevant aspect here is that the degassing process takes place with simultaneous heating of the material by friction (introduced by the rotating screw as well as via the barrel heating of the first extruder). The simultaneous heating causes a significant increase in diffusion in the material and is thus much more efficient than upstream drying systems, which have to introduce the energy via heated air.

This feed zone of the first extruder is much longer than in conventional extruders. In the second section of the first extruder, rapid and gentle melting and material homogenisation take place.

Another essential feature of the proposed solution of the described extruder cascade is the use of a twin-screw extruder with screws rotating in opposite directions. This extruder, which is fed with polymer melt, is used to degas the melt and to build up pressure. With the counter-rotating twin-screw extruder, the above-mentioned advantages in the degassing process result from the low rotational speeds. The coalescence of the gas bound in the melt is promoted into bubbles, which are conveyed to the surface by the existing rotary flow. As a result, the gas bubbles escape into the atmosphere or are sucked out by the vacuum present. This macroscopic gas transport is much more efficient than a purely diffusive gas transport.

Another advantage of the counter-rotating twin-screw extruder is that the screw geometry creates closed conveying chambers and therefore the discharge or metering zone has the same function as a melt pump. This means that, apart from leakage flows, there is forced conveying and thus the throughput can be controlled. Another advantage of the screw geometry is that self-cleaning is achieved by mutual scraping of the screws. Melt pumps are usually lubricated by the pumped polymer. In the sliding bearings, however, the material is subject to permanent shearing and thus degradation. In addition to the short residence time and the self-cleaning, the pressure build-up is much more efficient than with a combination of a melt pump with a single- or twin-screw extruder, which also introduce an increased shear input due to the conveying by drag/pressure flow.

BRIEF DESCRIPTION OF THE DRAWING

The drawing shows an example of an embodiment of the invention. The single FIGURE schematically shows the structure of a device for producing a melt from a granulate or recyclate of PET.

DETAILED DESCRIPTION OF THE INVENTION

The FIGURE shows a device with which a starting material M in the form of a granulate or a recyclate is processed into a melt S. A plastic film, for example, can then be produced from the melt S, for which purpose a nozzle 12 for flat film extrusion is schematically indicated.

The material M is fed via a feed hopper 13 to a vacuum lock 1, which keeps the material M under a reduced pressure compared to the ambient pressure. It is indicated that the area of the vacuum lock 1 discharges gas G. In principle, the vacuum lock 1 operates by means of two sliders 19 and 20, through which a hermetically sealed space can be created which can be evacuated by means of a pump (not shown). By controlling the sliders 19, 20 accordingly, the material M can thus be kept under a negative pressure. When the slider 20 is opened, the negative pressure is accordingly also propagated downwards in the direction of a dosing element 8.

Following the vacuum lock 1, i.e. still under negative pressure, the material M reaches the metering element 8, which is driven by a drive motor 14 and which, in the shown embodiment, is designed as a screw conveyor unit. With the metering element 8, a predetermined amount of material M can be conveyed per time and fed to the further process. Gas G is further extracted from the material M by the vacuum that is also applied in the area of the metering element 8.

From the metering element 8, the material M enters a first extruder 2, which has a filling region 3 and a feed zone 4. The first extruder 2 is driven by a drive motor 15 and a gearing 16. In the first extruder 2, the material M is fed with such a mass or volume flow (mass or volume of material M per time) that the screw channels of the first extruder are only partially filled (underfed mode). At the same time, the material M is melted by the rotation of the screw of the first extruder 2 and by a heating of the screw barrel of the extruder 2, which is not shown.

Due to the only partial filling of the screw channels in the feed zone of the first extruder 2, an effective degassing of the material M can take place, which is indicated in the FIGURE (removal of the gas G). The degassing of the material M therefore takes place against the conveying direction of the first extruder 2. The degassing thus takes place via the feed opening or the metering element 8. In the second section of the screw of the first extruder 2, which follows the feed zone 4 in the conveying direction, the material is compressed, melted and homogenised. Furthermore, the necessary pressure build-up takes place here in order to convey the polymer melt further.

The now melted material M passes at the end of the first extruder 2 into a second extruder 5, which is designed as a twin-screw extruder with counter-rotating screws. The second extruder 5 is driven by a drive motor 17 via a gearing 18 (i.e. namely the two screws of the extruder) and has a degassing zone 6 and a metering zone 7. In the degassing zone 6, a further discharge of gas G from the melt takes place. In the metering zone 7, pressure is built up in the melt in order to convey the melt out of the second extruder 5. The second extruder 5 thus ensures degassing of the melt as well as material discharge and pressure build-up in the material M.

Behind the second extruder 5 a filter 9 is indicated, which filters the melt S. However, there is no longer a melt pump downstream of the second extruder 5, as the required pressure in the melt is built up by the second extruder 5.

A first rheometer 10 is arranged between the first extruder 2 and the second extruder 5, which measures the viscosity of the melt at this location. Similarly, a second rheometer 11 is arranged behind the second extruder 5, which also measures the viscosity of the melt.

The viscosity of the melt at the respective locations of the two rheometers 10, 11 can be taken into account in the closed loop control when controlling the system, in particular to influence the vacuum in the vacuum lock 1 and thus ensure that the melt S leaves the system with a defined quality.

Thus, starting from material M in the form of granulate or recyclate (in particular in the form of bottle or film regrind), the production of granulate, of films, of fibres, of filaments or of other plastic products and semi-finished products can take place.

Cascade extrusion can be extended, for example by implementing another filter between the first and second extruder. Likewise, instead of a single-screw extruder, a co-rotating twin-screw extruder can be used as the first extruder 2.

LIST OF REFERENCES

1 Vacuum lock
2 First extruder
3 Filling region of the first extruder
4 Feed zone of the first extruder
5 Second extruder
6 Degassing zone of the second extruder
7 Metering zone of the second extruder
8 Metering element
9 Filter
10 First rheometer
11 Second rheometer
12 Nozzle
13 Feed hopper
14 Drive motor
15 Drive motor
16 Gearing
17 Drive motor
18 Gearing
19 Slider
20 Slider
M Raw material (granulate, recycled material)
G Gas
S Melt

The invention claimed is:

1. A method for processing polycondensates, wherein a material in a form of granules or in the form of recyclate is processed to form a melt, wherein the method comprises the following steps:
    a) feeding the material into a vacuum lock in which the material is held at a pressure lower than the atmospheric pressure;
    b) conveying the material from the vacuum lock into a first extruder that has a filling region and a feed zone, wherein the filling region and the feed zone are held at a pressure lower than the atmospheric pressure and wherein the material is at least partially melted in the first extruder;

c) conveying the at least partially melted material from the first extruder into a second extruder, wherein the second extruder is designed as a twin-screw extruder and the two screws thereof are turned in the opposite direction, wherein the second extruder comprises at least one degassing zone and a metering zone that follows in the conveying direction, wherein the melted material is degassed in the degassing zone and the melted material is pressurised in the metering zone and is output out of the second extruder.

2. The method according to claim 1, wherein a metering element is arranged between the vacuum lock and the first extruder, wherein the material being conveyed from the vacuum lock into the first extruder at a predetermined mass or volume flow.

3. The method according to claim 2, wherein the material is conveyed from the metering element into the first extruder with such a mass or volume flow that the feed zone of the first extruder is not completely filled with material.

4. The method according to claim 1, wherein the pressure in the vacuum lock and/or in the filling region of the first extruder is at most 100 mbar.

5. The method according to claim 1, wherein the pressure in the degassing zone of the second extruder is at most 100 mbar.

6. The method according to claim 1, wherein a single-screw extruder is used as the first extruder.

7. The method according to claim 1, wherein the material is filtered between the first extruder and the second extruder.

8. The method according to claim 1, wherein the material is filtered after the second extruder.

9. The method according to claim 1, wherein a viscosity of the material between the first extruder and the second extruder is measured by means of a rheometer.

10. The method according to claim 1, wherein a viscosity of the material downstream of the second extruder is measured by means of a rheometer.

11. The method according to claim 9, wherein, depending on a measured viscosity of the material downstream of the first extruder and/or downstream of the second extruder, at least one process parameter is changed.

12. The method according to claim 11, wherein the process parameter is the negative pressure in the filling region and/or in the feed zone of the first extruder.

13. The method according to claim 11, wherein the process parameter is the negative pressure in the degassing zone of the second extruder.

14. The method according to claim 1, wherein means for increasing the pressure is arranged downstream of the second extruder and the pressure in the material is increased by this means.

15. The method according to claim 1, wherein the material is dried before the material is fed into the vacuum lock.

16. The method according to claim 1, wherein, after the material has been fed into the vacuum lock, an increase in the viscosity of the material is carried out by solid state polycondensation.

17. The method according to claim 1, wherein, after melting the material in the first extruder and/or in the second extruder, the viscosity of the material is increased by liquid state polycondensation.

18. A device for processing polycondensates, with which a material can be processed into a melt in a form of granulate or in the form of recyclate, comprising:

a first extruder comprising a filling region and a feed zone, and a second extruder downstream of the first extruder, wherein the second extruder being designed as a twin-screw extruder and the second extruder having at least one degassing zone, comprising a vacuum lock in which the material can be kept under a reduced pressure compared to the atmospheric pressure, wherein the first extruder being downstream of the vacuum lock, wherein in the second extruder the two screws are designed to rotate in opposite directions and wherein the second extruder has a metering zone following the degassing zone in the conveying direction, wherein a filter is arranged between the first extruder and the second extruder.

19. The device according to claim 18, wherein a metering element for conveying the material with a predetermined mass or volume flow is arranged between the vacuum lock and the first extruder.

20. The device according to claim 18, wherein the first extruder is a single-screw extruder.

21. The device according to claim 18, wherein a filter is arranged downstream of the second extruder.

22. A device for processing polycondensates, with which a material can be processed into a melt in a form of granulate or in the form of recyclate, comprising:

a first extruder comprising a filling region and a feed zone, and a second extruder downstream of the first extruder, wherein the second extruder being designed as a twin-screw extruder and the second extruder having at least one degassing zone, comprising a vacuum lock in which the material can be kept under a reduced pressure compared to the atmospheric pressure, wherein the first extruder being downstream of the vacuum lock, wherein in the second extruder the two screws are designed to rotate in opposite directions and wherein the second extruder has a metering zone following the degassing zone in the conveying direction, wherein a rheometer for measuring a viscosity of the material is arranged between the first extruder and the second extruder.

23. A device for processing polycondensates, with which a material can be processed into a melt in a form of granulate or in the form of recyclate, comprising:

a first extruder comprising a filling region and a feed zone, and a second extruder downstream of the first extruder, wherein the second extruder being designed as a twin-screw extruder and the second extruder having at least one degassing zone, comprising a vacuum lock in which the material can be kept under a reduced pressure compared to the atmospheric pressure, wherein the first extruder being downstream of the vacuum lock, wherein in the second extruder the two screws are designed to rotate in opposite directions and wherein the second extruder has a metering zone following the degassing zone in the conveying direction, wherein a rheometer for measuring a viscosity of the material is arranged downstream of the second extruder.

24. The device according to claim 18, wherein means for increasing the pressure are arranged downstream of the second extruder.

* * * * *